July 7, 1964     B. J. MIDLOCK     3,140,485
RADAR CONTROL SYSTEM RESPONSIVE TO A VEHICLE
MOVING ALONG A TRAFFIC PATH
Filed Aug. 4, 1958
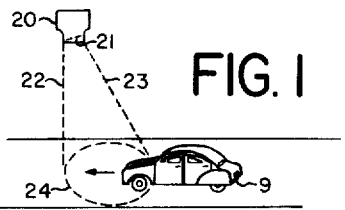
FIG. 1
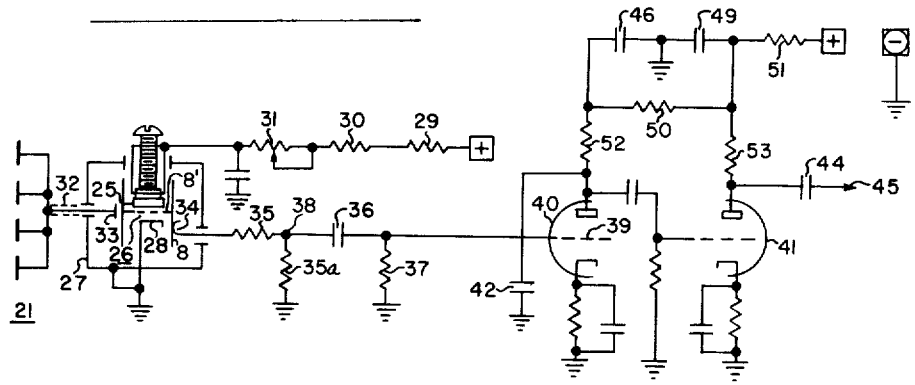
FIG. 2
FIG. 3
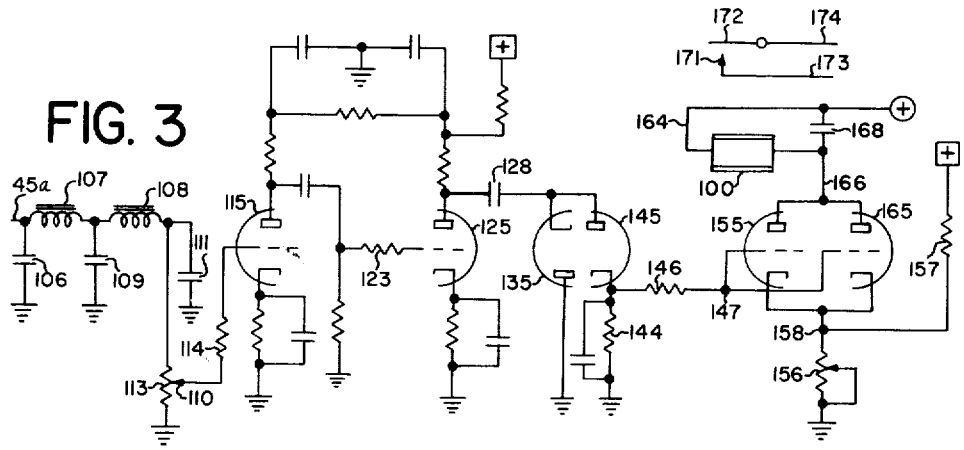
FIG. 4
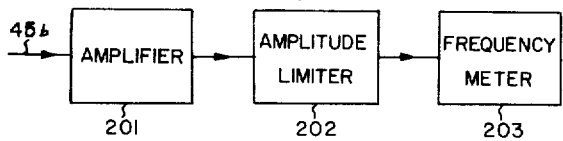
INVENTOR.
BERNARD J. MIDLOCK
BY
Edward W. Eames
ATTORNEY United States Patent Office 3,140,485
Patented July 7, 1964

3,140,485
RADAR CONTROL SYSTEM RESPONSIVE TO A VEHICLE MOVING ALONG A TRAFFIC PATH
Bernard J. Midlock, Norwalk, Conn., assignor, by mesne assignments, to Laboratory for Electronics, Inc., Boston, Mass., a corporation of Delaware
Filed Aug. 4, 1958, Ser. No. 752,786
10 Claims. (Cl. 343—8)

This invention relates to an improvement in control or responsive devices for detecting or measuring the speed of moving objects and is of particular value in sensing devices of the Doppler radar type employing ultra high frequency radio waves or microwaves for detecting the passage or measuring the speed of vehicles moving along a roadway or other traffic path, for example. In this connection the term ultra high frequency as used herein is intended to include microwaves or radio frequencies above about 2000 megacycles such that Doppler beat frequencies derived from the motion of the vehicle will be substantially in the audio frequency range for the usual range of vehicle speeds.

More particularly the invention relates to an improvement in a radio reflection system employing continuous or substantially continuous transmission of ultra high frequency radio wave energy and reception of such wave energy reflected from moving objects by a common oscillator-detector and a common antenna, and deriving a low frequency output by the motion of the object reflecting the radio waves, the improvement relating to the taking of this low frequency output from the grid connection of the ultra high frequency oscillator instead of from the usual anode connection, and thus obtaining a marked gain in signal to noise ratio for the desired low frequency signal.

For convenience of reference this low frequency output will be generally referred to herein as a Doppler beat frequency signal, this signal resulting from the mixing of the received reflected waves and the original or transmitted waves, the reflected waves being shifted in frequency in proportion to the relative speed between the moving reflecting object and the source of the transmitted waves, in accordance with the well known Doppler effect. The output low frequency signal may also be considered to be the result of a cyclic variation of loading of the antenna and oscillator-detector system, which variation will also have such low frequency proportional to such relative speed as the reflecting object moves through successive half wave lengths of the transmitted-reflected waves in reducing or increasing the transmission-reception path length depending on whether the vehicle is approaching or departing. By either method of analysis the resulting low frequency is the same and can be referred to as the Doppler beat frequency.

For a further more detailed explanation of the Doppler effect and the Doppler beat frequency if desired, reference may be had to an article by John L. Barker entitled "Radar Measures Vehicle Speed" at pages 239–249 in the "Traffic Quarterly" of July 1948, published by the Eno Foundation for Traffic Control at Saugatuck, Connecticut, Mr. Barker being connected with the assignee of the present application.

In traffic responsive devices for detecting the passage of vehicles or measuring their speeds, it is important that the apparatus be reliable over prolonged periods of continuous service in a wide variety of conditions, and also that the apparatus be compact so as to be suitable to be placed preferably over the road to respond to traffic in individual or selected traffic lanes for example, and to be of relatively low cost.

Thus the discovery in the present invention that the Doppler beat frequency signal can be derived from the grid connection in the present type of circuit with a sufficient signal level and a much improved signal to noise ratio is of great importance in providing a traffic responsive device to serve such needs.

The invention has been found particularly applicable to ultra high frequency oscillator tubes of the disk seal type well known as a lighthouse tube, such as the 2C40 tube, and associated cavity resonator, for example, although it is not necessarily limited thereto.

It is therefore a general object of the invention to provide an improved circuit in a system employing radio reflection for detection or speed measurement of moving objects.

It is also an object of the invention to provide an improved circuit including pick-off of the Doppler beat frequency signal from the grid-cathode circuit of an ultra high frequency oscillator tube having anode, cathode and grid, and serving as a generator of ultra high frequency electrical oscillations and as a detector of the Doppler beat frequency derived from the mixture of such oscillations with received oscillations reflected by a moving object intercepting such oscillations transmitted from the generator.

It is a further object of the invention to provide in a Doppler beat frequency sensing device for detection of vehicles or speed measurement thereof and including an ultra high frequency oscillator tube unit having an anode, a cathode and a control grid and an antenna coupled to such tube for transmitting ultra high frequency radio waves and receiving simultaneously some of such waves reflected from a vehicle moving relative to said antenna, the improvement of deriving the Doppler beat frequency signal from connection between the grid and the cathode.

It is an additional object of the invention to provide in a Doppler beat frequency responsive system for detecting or measuring the speed of moving objects an improved circuit including an ultra high frequency oscillator having control grid, cathode and anode and a self-bias circuit therefor for generating and transmitting ultra high frequency electrical waves and for receiving waves reflected from the moving object so that the resulting mixing of the waves has a Doppler beat frequency component from the motion of said object and appearing as a variation in the bias in said self-bias circuit, and an output connection from said self-bias circuit for deriving a Doppler beat frequency signal from said component, and a circuit for translating said Doppler signal into an indication of speed or passage.

It is also an object of the invention to provide an improved system of the radio reflection type for responding to a vehicle moving nearby along a traffic path and having means for transmitting a beam of ultra high frequency electro-magnetic waves on to or across said path and receiving any of such waves reflected from a vehicle passing through said beam and mixing said waves so that a Doppler beat frequency component is present therein, and means for translating said component into a brief output pulse indicative of passage of the vehicle through said beam or for translating said component into an indication of the speed of said vehicle, and in which said transmitting and receiving means includes an electronic tube having anode, cathode, control grid and a self-biasing circuit between grid and cathode, and having such Doppler beat frequency component as a variation of bias in said biasing circuit, and said means for translating said component includes a connection to said self-biasing circuit to derive a part of said component therefrom for such translation.

Other objects of the invention may subsequently appear from the appended claims.

Reference is now made to the drawings illustrating a preferred embodiment of the invention and some alternative aspects of the same.

FIG. 1 shows an enlarged elevation view of a radar detector unit or antenna in relation to a roadway.

FIG. 2 shows a schematic circuit diagram of a radar motion sensing system in accordance with preferred form of the invention.

FIG. 3 shows a schematic circuit of one form of translating circuit for connection to FIG. 2 to comprise a complete radar vehicle detector unit incorporating the invention.

FIG. 4 shows in block form another form of translating circuit for connection to the circuit illustrated in FIG. 2 to comprise a complete radar vehicle speed measuring or detecting device incorporating the invention.

FIG. 1 illustrates the preferred relation of the antenna unit to the roadway for approaching traffic to enable the detector unit according to the one aspect of the invention to derive a brief actuation pulse on the approach side of the roadway, and to substantially disregard vehicles on the opposite side of the roadway.

It will be noted that the antenna unit 21, illustrated in broken line form inside the radar unit 20 is mounted at a slight angle to the horizontal, which is preferably of the order of 15 degrees, and the antenna beam pattern between half power points is approximately 30 degrees between lines 22 and 23. The line 22 represents one edge of such beam pattern extending substantially vertically downward from the antenna to the roadway and the line 23 represents the other edge of the beam pattern, the line extending outward and downward along the roadway, toward approaching vehicles at an angle of approximately 30 degrees, thus providing the approximately elliptical pattern, 24, of the radiant wave energy within one side of the roadway on which it is desired to detect the vehicles.

It can be appreciated that there is a diminishing amount of radiated wave energy outside of this pattern but sensitivity of the electrical apparatus can be adjusted, in association with its particular frequency response feature described below, to substantially eliminate detection of vehicles on the opposite side of the road. Similarly by proportioning the antenna by arrangement of multiple dipole elements or reflector or the like the beam pattern may be made narrower across the roadway or otherwise varied as desired.

A vehicle 9 is illustrated having just entered the elliptical pattern of the radiant wave energy with on arrow indicating the direction of travel of the vehicle.

The position of the unit 20 and the angle of the antenna 21 as illustrated in FIG. 1 is particularly associated with the radar vehicle detector. The circuitry of one type of radar vehicle detector is illustrated as a combination of FIG. 2 and FIG. 3.

It will be appreciated that if the apparatus illustrated in FIG. 2 and FIG. 4 be combined to represent a radar speed detecting and speed measuring device then the antenna would be mounted at a greatly increased angle to the horizontal, so that the beam pattern would extend farther up the road toward the approaching vehicle.

An example of a radar speed detecting and measuring device is found in U.S. Patent 2,629,865, issued February 24, 1953, to John L. Barker under the title of Radio Echo Apparatus for Detecting and Measuring the Speed of Moving Objects.

By increasing the angle from the horizontal from 15 degrees toward 90 degrees, for example, line 22 would move off vertical toward the approaching vehicle and the line 23 would move in the same direction up the road so that the pattern of the radiant wave energy on the road bed would appear substantially longer than illustrated in FIG. 1.

Referring in particular to FIG. 2, a circuit diagram is presented including a B+ power supply, of the order of 210 volts D.C., for example, represented by a plus in a square, which is applied to the anode 25 of an ultra high frequency oscillator tube 26. This tube is a conventional co-planar triode of the lighthouse type 2C40, for example, with a re-entrant type associated cavity resonator 27.

My U.S. Patent No. 2,797,324, issued June 25, 1957, under the title Space Resonant System, includes a description and diagrams of the lighthouse type 2C40 tube and its associated cavity resonator.

FIG. 1 of my said patent illustrates a partly cut away view of a lighthouse tube and its associated cavity resonator, and shows a grid connector 19 in contact with a grid sleeve 8 and an external contact 20 via an insulated bushing in a cathode cylinder 10 serving as the outer shell of the resonator.

The grid connector 34 of FIG. 2 of the present application may coresponding to the grid connector or finger 19 of the patent and the outer shell or cathode cylinder 27 of the present application may correspond to cylinder 10 of the patent for example.

In the present application in FIG. 2, the grid connector 34 is connected to ground and the cathode cylinder 27 through two resistors 35 and 35a. These resistors, 35 and 35a, serve to provide self-bias for operation of the oscillator tube 26 and are comparable to the resistance 23 illustrated in FIG. 1 of my said patent. The junction 38 between the two resistors 35 and 35a in the present FIG. 2 preferably substantially equally divides the grid leak resistance, to which junction a capacitor 36 is connected, although such division is not critical.

The capacitor 36 could alternatively be connected to the grid connector 34 or its external line instead of to junction 38 as shown. As a further alternative the resistor 35 could be placed on the right side of junction 38 instead of the left side as shown, in which case the resistance of 35 might be increased and that of 35a also increased.

It is preferred, however, to divide the grid leak resistance as illustrated and connect the capacitor 36 to the junction 38 so as to reduce the loading effect of the output or coupling circuit of capacitor 36 and resistor 37 on the grid circuit of the oscillator tube 26.

The B+ voltage is applied to the anode 25 of the lighthouse tube through two resistors 29 and 30 and a potentiometer 31 in series.

The antenna 21, also illustrated in FIG. 1 above, is connected via coaxial line 32 to the radio frequency coupling element 33 inside the cavity resonator 27.

One form of this coupling connection is illustrated in my aforementioned Patent 2,797,324.

The antenna assembly 21, schematically illustrated in FIG. 2, may include, for example, an arrangement of two columns of four dipoles each, side by side, all mounted on a reflector backing plate and preferably arranged for horizontal polarization. With the B+ applied to the tube 26 as described, the oscillator tube 26 generates ultra high frequency energy which is preferably continuously transmitted via line 32 to the antenna assembly. Reflected wave energies are also received by the antenna assembly and are conducted to the oscillator tube 26.

When such reflected wave energies are reflected by a moving body they are received as Doppler shifted in frequency.

Thus the generated wave energies present in the cavity resonator and the reflected wave energies conducted to the cavity resonator via the antenna assembly are mixed in the oscillator-detector tube 26, and the resulting Doppler beat frequency will appear as a periodic change in anode current and in grid current.

The resulting Doppler beat frequency is proportioned to the speed of the vehicle multiplied by a cosine factor varying with the angle between the line of travel of the vehicle and the intercepted wave energy along the line representing the shortest distance from the vehicle to the antenna.

Normal operation of the oscillator-detector tube 26 produces a grid bias voltage across the grid leak bias resistance 35 and 35a, which resistors form a voltage divider as presented.

Superimposed upon this grid bias voltage is found a voltage developed from and varying in accordance with the Doppler beat frequency. In accordance with the present invention this voltage in the grid circuit has been found to be particularly suitable for obtaining the Doppler beat frequency output signal therefrom with marked gain in signal to noise ratio.

Thus, a portion of this varying voltage is passed by the coupling capacitor 36, connected between the junction 38 and the junction of resistor 37 and grid connection 39 of tube 40, thus applying the Doppler beat frequency to tube 40 for amplification.

The combination of capacitor 36 and resistor 37 forms a resistor-capacitor coupling circuit as well as a high pass filter. This high pass filter combination may be designed with substantial attenuation below 20 cycles per second and severe attenuation below 10 cycles per second, for example, for an ultra high frequency of 2455 megacycles for example.

The Doppler signal is amplified in two stages of resistance-capacity coupled amplifiers 40 and 41 having a band frequency response of from 8 cycles to 1000 cycles per second for the 2455 megacycles per second of radio frequency for example. High frequency attenuation is provided by plate by-pass capacitor 42. The amplified signal which represents the Doppler beat frequency in the oscillator tube 26, is applied to the capacitor 44.

The B+ supply is fed to the anodes of triodes 40 and 41 by means of decoupling networks including capacitors 46 and 49 and resistors 50 and 51. Plate load resistors 52 and 53 develop the A.C. signal applied via the capacitor 44 to line 45 for output to desired translating circuits or response devices. Conventional self-bias is provided in the cathode to ground circuit.

In considering the self-bias action of the oscillator-detector tube 26, and the appearance of the Doppler beat frequency in the grid-cathode bias resistance 35–35A circuit, it will be appreciated that the ultra-high frequency energy is by-passed direct from the grid to the cathode within the cavity resonator by ultra high frequency capacity coupling in connection with the insulated bushing as the grid connection 34 passes through the cathode cylinder 27 forming the outer shell of the resonator for example.

Referring to FIG. 3 the circuit diagram here illustrated may be connected with the circuit illustrated in FIG. 2 so that the signal output at line 45 of FIG. 2 is applied to line 45a of FIG. 3.

When employed with line 45 of FIG. 2 connected to line 45a of FIG. 3 the entire combined circuit illustrates a radar vehicle detector, providing an output pulse in response to passage of a vehicle through the radar beam.

The applied signal at 45a line in FIG. 3 is applied to the low pass filter comprising capacitors 106, 109, and 111, inductors 107 and 108, and load resistance 113. The inductors 107 and 108, connected in a series with the resistance 113 from the output 45a and ground and the successive shunting capacitors 106, 109 and 111 of this low pass filter provide substantial attentuation of frequencies above 40 cycles per second with severe attentuation of frequencies appreciably above 50 cycles per second.

Since the high pass filter comprising coupling capacitor 36 and resistance 37, of FIG. 2, primarily sets the low limit of frequency which can be passed by the circuit as previously described, the low pass filter in FIG. 3 and the high pass filter in FIG. 2 together provide in effect a band pass filter having a band pass of approximately 20 cycles per second, with the pass characteristic of the circuit peaked at approximately 30 cycles per second with quite rapid attenuation above 40 cycles per second and below 20 cycles per second, although the considerably reduced signals between 20 and 10 cycles per second and between 40 and 50 cycles per second may have some limited effect for strong input signals with high sensitivity adjustment.

It has been found that a band pass arrangement on this range has additional advantage since hum voltages corresponding to 60 and 120 cycles per second for alternating current power supply and related sources are severely attenuated so as not to effect the circuit.

The output of the low pass filter is obtained by adjustable tap 110 on resistance 113 serving as a potentiometer adjustment sensitivity of the entire circuit when it is connected via grid resistor 114 into the input of the two stage amplifier associated with the tube sections 115 and 125.

This is a conventional resistance-capacitance coupled amplifier with the addition of series resistance 114 in the grid input of tube 115 and series resistance 123 in the grid input of tube 125 to reduce blocking of the amplifier by any excessive input signal strength.

The anode of the amplifier tube section 125 is coupled via coupling capacitor 128 to the dual diode rectifier-detector 135, 145, the tube section 145 providing a D.C. voltage across load resistor 144 in its cathode circuit of a positive value generally proportionate to the amplitude of the Doppler beat frequency signal as attenutaed by the band pass filter arrangement to respond to a vehicle passing through the angled beam and thus producing a Doppler beat frequency reduced by the cosine effect. This rectifier is connected for double action so that the maximum voltage can be secured from its output.

The output of the rectifier-detector tube section 145, appearing across load resistance 144 is essentially a D.C. voltage and is connected via resistance 146 to the parallel connected grids of the dual tube 155, 165 serving as a threshold amplifier to supply operating current to the relay 100.

The cathodes of both tube sections 155 and 165 are connected in parallel and thence via adjustable resistance 156 to ground, and are also connected at junction 158 at the upper end of resistance 156 via resistance 157 to the B+ supply. The anodes of the tube section 155 and 165 are also connected in parallel and via lead 166 to the coil of relay 100, the other side of this coil being connected via lead 164 to an alternating current supply indicated by a plus in a circle. The coil of the relay is shunted by capacitor 168 to sustain the action of the relay on this A.C. power supply.

Thus the tube sections 155 and 165 are parallel connected and together are operated on fixed bias provided by the connection of the cathode to junction 158 on the potential divider provided by resistances 157 and 156 between the B+ supply and ground. This bias may be adjusted at the adjustable resistance 156 so that sufficient anode current to operate the relay will be provided at a desired D.C. voltage with respect to ground. The voltage developed across resistor 144 is applied to the grids at junction 147, this voltage corresponding to the voltage output of the rectifier-detector 135, 145.

The sensitivity control including tap 110, and resistor 113 provides means whereby slight changes in the amplifier gain characteristics and in the antenna and radio frequency power output, may be compensated for to provide best operation in response to vehicle actuation.

Since the effective zone laterally with respect to the roadway may be increased by either broadening the antenna beam or increasing the sensitivity of the unit, this sensitivity control also serves as a means for adjusting the lateral coverage.

The contacts 171, 172 are controlled by the coil of the relay 100 to close the output circuit on lines 173 and 174 for example, to actuate a signal or a traffic actuated signal controller or other device in response to passage of a vehicle on the approach side of the road at the vehicle detector antenna location for example.

The combination of FIG. 2 and FIG. 3, forming a vehicle detector apparatus, having been described, the combination of FIG. 2 and FIG. 4 will be considered.

FIG. 4 illustrates in block diagram form a circuit for translating the amplified Doppler beat frequency output signal from line 45 of FIG. 2 into a speed indication for the vehicle. The respective blocks 201, 202 and 203 designated AMPLIFIER, AMPLITUDE LIMITER and FREQUENCY METER provide such translation from input line 45b when connected to output line 45 of FIG. 1.

FIG. 4, in particular, illustrates in block diagram form a part of a circuit diagram illustrated in full in circuit form, and described in U.S. Patent 2,629,865 issued to John L. Barker on February 24, 1953, and identified as FIG. 4 in the said patent.

The input line 45b of FIG. 4 in the present application is comparable to a line 47 in the circuit diagram in FIG. 4 of the said Barker patent. Comparing the two figures in general, the circuit diagram of the said Barker patent includes an amplifier section including a pentode 50, represented by a block labeled AMPLIFIER in FIG. 4 in the present application, and an amplitude limiter section including a pentode 70 represented by a block labeled AMPLITUDE LIMITER in FIGURE 4 in the present application. A frequency counter and meter section including a dual diode 100 and a vacuum tube voltmeter including pentode 120 and a meter M, in the Barker patent are represented by a block labeled FREQUENCY METER in FIG. 4 of this application.

This FIG. 4 of the present application corresponds for example to the circuit of FIG. 4 of the said Barker patent to the right of the line 47 in the latter, and disregarding the part of the circuit of the latter to the left of line 47 therein.

Returning to consideration of the combination of FIGS. 2 and 4 of my application consider that line 45 of FIG. 2 is connected to line 45b of FIG. 4. This combination will produce a speed detecting and speed measuring device similar to that disclosed in the Barker Patent 2,629,865 for example.

Generally, the ultra high frequency energy is generated and transmitted and the reflected wave energies are received as previously described with reference to FIG. 2 above.

The Doppler shifted frequency is picked off the grid of the oscillator tube 26 and a portion of the voltage developed across the voltage divider 35–35a is amplified and applied to the output 45 all as described more fully above.

The output signal from line 45 is applied to the line 45b in FIG. 4 herein, is amplified and is fed through the amplitude limiter section to the frequency counter section.

The frequency counter section produces an output voltage which is proportional to the frequency of the signal on lines 45–45b, this being the Doppler beat frequency amplified signal. This output voltage is measured and indicated on a vacuum tube voltmeter, for example.

The vacuum tube voltmeter is calibrated in speed (miles per hour for example) since the voltage that is measured is proportional to the Doppler beat frequency which is in turn proportional to the speed of the moving body which reflects the wave energy as it approaches or departs from the antenna, within the beam of the transmitted wave.

The Barker Patent 2,629,865 is referred to as one example of a speed translating or speed measuring circuit and other forms of such circuits might be used.

Where the measurement of speed is to be emphasized as in FIG. 4 for example, the antenna may appropriately be directed at a greater angle to the vertical, i.e., nearer to horizontal, to obtain less reduction in Doppler frequency by the cosine effect previously mentioned or to obtain a longer continuing speed signal.

It is obvious that although FIG. 1 illustrates the antenna 21 directed at a slight angle toward an approaching vehicle, the antenna may be directed toward a departing vehicle as an alternative arrangement.

Directing the antenna toward a departing vehicle instead of toward an approaching vehicle would not change in any degree the descriptions of the circuit, nor its response to the Doppler shifted wave energies received, as reflected from the moving body, since the Doppler beat frequency will be the same for any given distance and corresponding angle for a departing or an approaching vehicle.

It may be desired to combine the vehicle detecting circuit and the speed detecting and measuring circuit so that vehicles may be counted, by an impulse counter for example at the vehicle detector output, and the speed of the vehicle indicated at the output end of the speed detector and measuring circuit.

Should this be desired then the antenna may be directed toward the approaching vehicle or toward the departing vehicle at a compromised angle, somewhat between the angle generally employed when the antenna is part of a vehicle detecting unit and the angle generally employed when the antenna is part of a unit primarily for speed measurement.

Certain features of the disclosure of the present application for patent are also disclosed and claimed in a prior copending application Serial Number 511,995, filed May 31, 1955, by John L. Barker, now issued U.S. Patent Number 2,965,893, and assigned to the same assignee as the present application.

Although the output circuit for the Doppler beat frequency from the grid-cathode circuit employs resistance-capacity coupling in the preferred form for the present purposes, it is possible that other well-known forms of coupling might be used in some instances.

Although some variations and modifications of the present invention have been illustrated and described it will be obvious to those skilled in the art that other changes in form, arrangement and connection of the various elements and substitution of equivalent components may be made without departing from the spirit of the invention within the scope of the appended claims.

I claim:

1. In a radio reflection system for sensing moving objects, the combination including an oscillator having control grid, anode and cathode for generating ultra high frequency electrical waves, an antenna connected to said oscillator for radiating such waves as electromagnetic waves for interception by such moving objects and for receiving such waves as reflected from such moving objects and passing such reflected waves to said oscillator for producing cyclic amplitude variations in the ultra high frequency electrical waves in said oscillator at a low frequency proportional to the speed of relative motion of said object with respect to said antenna, the oscillator having a self-bias circuit including a capacitor and other impedance in parallel between the said grid and cathode to provide operating bias for the oscillator and bearing said low frequency as a variation in the bias, and a load circuit in parallel with only a part of said self-bias circuit to obtain said low frequency as an output.

2. In a continuous wave Doppler radar system for sensing a moving object and including an oscillator having control grid, anode and cathode circuits and a grid to cathode self-biasing circuit therefor for generating ultra high frequency waves for transmission and for reception after reflection from the moving object such that a Doppler beat frequency component is present both in the anode circuit and in the grid circuit from the motion of said object, said self-bias circuit having a long time constant with respect to radar frequencies and a short time constant with respect to detected Doppler signals developing a negative self-bias from oscillator grid current flow, the improvement of providing a condenser output circuit having a value of capacity sufficiently large to pass said low frequency Doppler signals, a resistance and a small condenser included in said self-bias circuit, and means for connecting said output circuit to said self-bias circuit for developing across said larger capacitor a voltage substantially less than said self-bias voltage from said grid current flow so that the oscillator will remain non-conducting for a period of time determined only by the grid leak time constant even though the larger capacitor has a negative voltage and a longer time constant.

3. In a continuous wave Doppler radar system for sensing a moving object, an improved circuit including an oscillator having control grid, anode and cathode circuits and a grid to cathode self-biasing circuit therefor for generating ultra high frequency waves for transmission and for reception after reflection from the object such that a Doppler beat frequency component is present in the grid circuit as a modulation of the self-bias, said self-bias circuit including a resistor and a small value of capacity for developing a negative grid bias from grid current flow for cutting off tube cathode to plate conduction and for permitting conduction a short time thereafter, and an output circuit having a substantially larger value of capacity, and means including a substantially high impedance to D.C. and low frequencies for connecting said output circuit to said self-biasing circuit so that a voltage substantially less than said self-bias voltage is developed across said larger condenser from grid current flow to derive said Doppler beat frequency component therefrom while also assuring that cathode to plate tube conduction is determined by the discharge of the self-bias condenser rather than the output condenser.

4. In a circuit as in claim 3, in which said self-bias circuit resistance and condenser are connected in parallel between said grid and said cathode, and said output circuit and said means including a tap intermediate the ends of said grid resistance, and one end of said larger capacitor connected with said tap, and a load resistance connected from said the other end of said larger capacitor to said cathode.

5. In a circuit in which a lighthouse tube having a grid, cathode and plate, and associated resonator operate both as a source of ultra-high frequency waves and as a receiver for such waves after reflection from a moving object so that the tube contains a mixture of the transmitted and received waves and a component of low frequency caused by intermodulation of such waves and proportional to the speed of movement of said object relative to said tube and resonator, a grid to cathode resistor-condenser self-bias circuit having a short time constant for said tube for providing negative bias resulting from grid current flow for so operating said tube and having an amplitude variation in said bias at said low frequency, said self-bias circuit including a lead contacting the grid and passing through the resonator and the capacitance formed by the grid connection to the resonator, and a condenser output circuit, means connecting said output circuit to said grid circuit to derive an output signal therefrom at said low frequency while limiting control of the oscillator to the voltage across the capacity formed between the resonator and grid lead.

6. In a circuit as in claim 5 said self-bias circuit including two resistances joined in series between said grid and said cathode, and said output circuit including a capacitor and a load resistance connected in series in that order between the junction of the two series resistances and said cathode.

7. In a system for responding to a vehicle moving along a traffic path, said system having means including an oscillator having an anode-cathode circuit and a grid-cathode circuit including a short time constant self-bias therefor for transmitting a beam of ultra-high frequency electromagnetic waves on to said traffic path and simultaneously receiving any of such waves reflected from a vehicle passing through said beam and mixing said waves to provide a Doppler substantially audio beat frequency component therein from the movement of said vehicle with said Doppler frequency component appearing both in said anode-cathode circuit and in said grid-cathode circuit, and means including a long time constant circuit for translating said Doppler audio frequency component into an indication of the speed of said vehicle through the beam, the improvement comprising means for connection of said translating means across at least a part of said grid-cathode circuit to derive said Doppler frequency therefrom for such translation and for reducing the capacitive loading effect of said long time constant translating means upon said short time constant self-bias circuit for thereby improving the ratio of Doppler signal to noise while maintaining a stable oscillator.

8. In a system employing radio reflection for responding to a vehicle moving along a traffic path by transmitting ultra high frequency waves above 2000 megacycles on to said path and simultaneously receiving waves reflected from the vehicle and deriving the Doppler beat frequency from the movement of the vehicle by mixing such waves, an improved circuit including an oscillator having an anode-cathode circuit and a self-biasing grid-cathode circuit for generating said transmitted waves and for so receiving and mixing said reflected waves for providing the Doppler beat frequency as a component of the grid bias in said grid-cathode circuit, said self-bias circuit including condenser means having a low impedance to said high frequency waves and a high impedance to said Doppler beat frequency, a voltage dividing resistance in said grid-cathode circuit having an intermediate tap thereon, said condenser and resistor forming a short time constant grid-leak circuit for maintaining oscillation, and an output circuit means having a long time constant connected between said tap and the cathode for deriving said Doppler beat frequency as as output without adding any substantial increase in said grid circuit time constant.

9. In a radar detector having a tube and associated cavity resonator for transmitting and receiving high frequency energy and for detecting a Doppler signal from the received wave, said tube having an anode, cathode and grid elements, the combination including means connecting said tube and resonator so that they cooperate as an oscillator for transmitting said energy, means for coupling said high frequency energy from said resonator to an antenna, means commonly connecting said resonator and cathode, means capacitively coupling said grid electrode through said resonator structure so that a grid leak bias condenser is provided for the oscillator while also serving as a high frequency by-pass, resistive means in shunt with said grid leak condenser, said resistive means and grid leak condenser having a time constant sufficiently short to sustain high frequency oscillations, capacitive output circuit means for passing said low frequency Doppler signals, and means including a substantial resistance for connecting said output circuit to said grid electrode for preventing said output circuit means from controlling said oscillator grid bias while also passing said Doppler signals.

10. In combination, a cavity resonator; a current control device having a control electrode, said device being mounted within said cavity and connected to develop ultra high frequency oscillations therein while also detecting Doppler signals; a terminal, means connecting said control electrode to said terminal outside of said cavity and capacitively coupled to said cavity so that said high frequency waves are shunted to said cavity and low frequency Doppler waves leave the cavity from the control electrode, resistive means in shunt with the capacitance of the control electrode, said resistance and capacitance having a time constant sufficiently short to maintain oscillations in said current control device and resonator; output circuit including a condenser for passing said Doppler signals, and means connecting said output circuit to said control device for receiving a portion of current flowing from said control electrode and for developing a negative bias across said condenser which is less than the negative bias developed between the control electrode and resonator.

References Cited in the file of this patent

UNITED STATES PATENTS

| | | |
|---|---|---|
| 2,347,194 | Holliday | Apr. 25, 1944 |
| 2,911,639 | Hopkins | Nov. 3, 1959 |
| 2,941,157 | Dilley | June 14, 1960 |

FOREIGN PATENTS

| | | |
|---|---|---|
| 585,988 | Great Britain | Mar. 4, 1947 |